April 14, 1970  G. HILGERS ET AL  3,506,065
PROCESS AND APPARATUS FOR COOLING HOT GAS MIXTURES
CONTAINING TITANIUM DIOXIDE
Filed Oct. 8, 1968  2 Sheets-Sheet 2

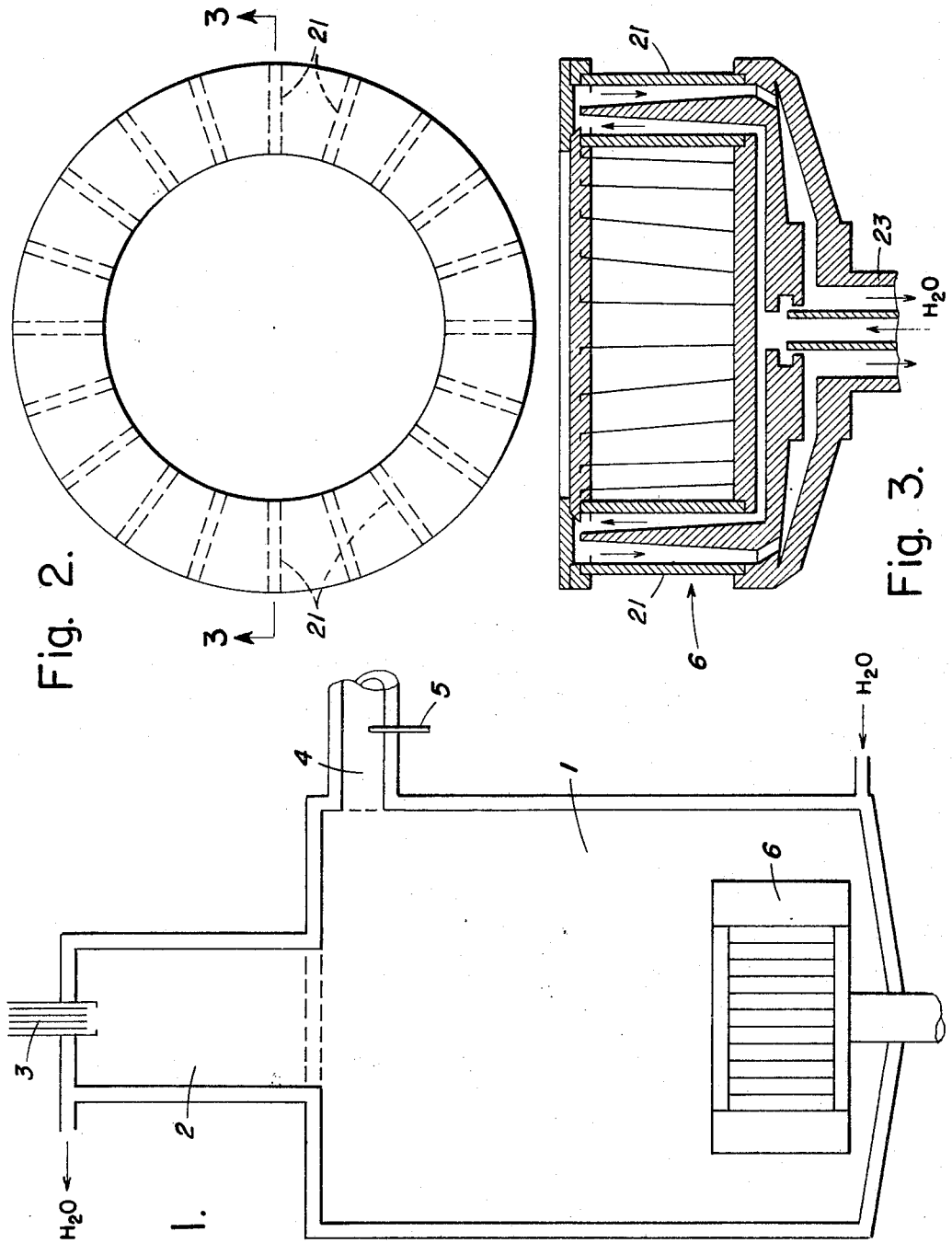

INVENTORS
Giovanni Hilgers
Achim Kulling
Hans Steinbach
Hermann Trüb

BY  H.L. Gemmons
AGENT

United States Patent Office 3,506,065
Patented Apr. 14, 1970

3,506,065
PROCESS AND APPARATUS FOR COOLING HOT GAS MIXTURES CONTAINING TITANIUM DIOXIDE
Giovanni Hilgers, Bergisch Gladbach, Achim Kulling, Opladen, Hans Steinbach, Bergisch Gladbach, and Hermann Trub, Opladen, Germany, assignors to Titangesellschaft m.b.H., Leverkusen, Germany, a corporation of Germany
Filed Oct. 8, 1968, Ser. No. 765,851
Claims priority, application Germany, Oct. 20, 1967, T 35,066
Int. Cl. F25b 13/00, 29/00; F28d 11/08
U.S. Cl. 165—2                                     15 Claims

ABSTRACT OF THE DISCLOSURE

The invention is concerned with a process and apparatus for continuously cooling hot gas mixtures containing titanium dioxide by passing the hot gas mixtures over cooled metal surfaces.

BACKGROUND OF THE INVENTION

In the manufacture of titanium dioxide pigments by reaction of titanium tetrachloride with oxygen or gases containing oxygen, the reaction mixture, i.e. the $TiO_2$ burdened reaction gases must be cooled rapidly to temperatures of about 700° C. and below after leaving the combustion chamber otherwise a coarsening of the $TiO_2$ particles takes place whereby pigment quality is impaired. Moreover in case the $TiO_2$ pigment is to be subsequently separated from the gases by use of filters the temperature must be lowered still further in order to avoid corrosion of the filters.

It is known that the cooling of reaction product gases containing titanium dioxide causes considerable difficulties. In respect to duration and temperature interval passed through, cooling must be adapted to the requirements for pigment formation. In order to obtain uniformly good pigments it is important that all pigment particles be cooled down at about the same rate. A still more difficult problem is presented by the tendency for the titanium dioxide particles to become plastic and sticky at high temperatures. As a consequence the pigment, as has been explained in detail in the German application No. 1,231,-224, coats, normally, all surfaces with which it comes in contact with soft, adhering coatings that have a pronounced heat insulating effect. This phenomenon has a particularly calamitous effect when the hot pigment suspensions are to be cooled by contact with stationary cool metal surfaces.

For this reason the suggestion has been made to cool these hot reaction product gases by contact with moving surfaces and to maintain the moving surfaces free of deposits by employing centrifugal force (German Patent No. 952,099). The device suggested for this purpose is, however, very expensive. Revolving drums are employed almost exclusively as the moving surfaces for effecting the total heat exchange. Accordingly, large masses must be moved rapidly. Furthermore, good packings are absolutely necessary for each of the four shafts employed in this device. These requirements may be met in the industry only at great expense thereby adversely affecting the economy of the process. Also as an additional disadvantage it may be mentioned that when using this device there is no possibility of controlling the flow conditions and thereby the rate of cooling of the $TiO_2$ burdened gases.

For this reason an alternative has been used for reducing the temperature of the hot $TiO_2$ burdened gas mixture wherein the hot gases are mixed with cold gases that are inert at the prevailing conditions (German Patents Nos. 915,082 and 1,212,952 and U.S. No. 2,508,272). These methods indeed, avoid the formation of deposits on the cool surfaces of the equipment and thereby secure uniform pigments of good quality but nevertheless have a serious shortcoming in that the volume of gas required to be put through the equipment is increased four to eight times, depending on the temperature desired; and that this large amount of gas must be freed of titanium dioxide, cooled and purified. This means high investment and processing costs. Furthermore, an additional disadvantage is that according to these processes no heat is removed from the systems. Therefore heat removal must be carried out later, after the pigment separation and at a lower temperature level which is a great disadvantage for indirect heat transfer.

SUMMARY OF THE INVENTION

It is desirable therefore, both for reasons of economy and efficiency, to combine the above-mentioned various cooling methods in such a way as to utilize their advantages while excluding their disadvantages. This would mean that the hot reaction product gases are cooled after leaving the combustion chamber by admixture with a relatively cool gas under conditions which avoid the introduction of additional cold gas into the system; and that heat removal from the reaction product gases be carried out at a relative high temperature level in such a manner as to avoid pigment deposits on the cooling surfaces and without the necessity of expensive cooling equipment.

DESCRIPTION OF THE DRAWINGS

FIG. 1 is a schematic elevation in section of apparatus for carrying out the process of this invention showing the cooling chamber having a combustion chamber at its upper end and a rotary blower at the bottom thereof;

FIG. 2 is a schematic plan view of the rotary blower;

FIG. 3 is a schematic elevation in section of the rotary blower on section line 3—3 of FIG. 2;

DESCRIPTION OF THE PREFERRED EMBODIMENT

Figure 5:
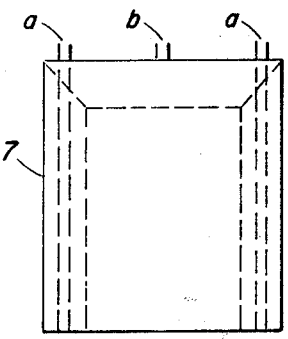
FIG. 5 is a schematic elevation of the inset used in the apparatus of FIG. 4.
Figure 9:
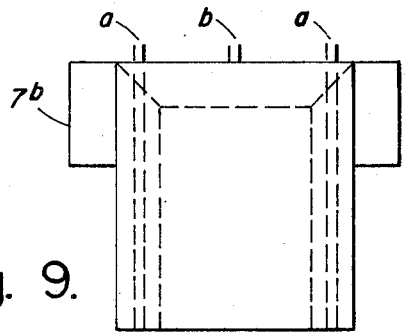
FIG. 9 is a schematic elevation of still another form of inset for use in the apparatus of FIG. 4.

According to the present invention the aforesaid requirements are met by introducing the hot titanium dioxide burdened product gases, emerging from the combustion chamber from above, downwardly into a vertically arranged, cooled, cylindrical cooling chamber at the bottom of which a cooled blower wheel is rotated which simultaneously cools the hot $TiO_2$ burdened product gases, reverses their direction and returns them again to the combustion chamber exit where the cooled gases mix with the hot, newly formed reaction product gases entering the cooling chamber thereby precooling them; the cooled reaction product gases preferably cooled to 700–500° C., being thereafter discharged from the cooling chamber at a rate proportional to the hot reaction product gases entering the cooling chamber. The amount of $TiO_2$ burdened gases returned by the blower wheel to the upper reaches of the cooling chamber should be a multiple of the amount of freshly formed gases entering the cooling chamber from the combustion chamber in a given unit of time so that the TiO₂ burdened gases are greatly accelerated. In this way the cooling takes place both on the rapidly moving wall surfaces of the blower wheel and on such other cool walls that are contacted by the TiO₂ burdened gases at high speed. In both cases the high relative speed between gas and wall favors the heat dissipation and reduces, or even completely prevents, TiO₂ deposits on the wall. Owing to their reversal, the cooled TiO₂ burdened gases are returned to the place of entrance of fresh hot reaction product gases and mix with these. In this respect the hot gases entering the cooling chamber are cooled in a manner similar to mixing the hot gases with a cold inert gas except that the gases used for cooling are at higher temperatures. In this manner a sudden quenching of the pigment is avoided and a lowering of the temperature is obtained in a manner that is commensurate with the desired pigment properties. This temperature reduction is sufficient also to decrease the stickiness of the pigment and thereby make it easier to keep the surfaces of the cooling chamber free from TiO₂ deposits during heat removal.

The cooling of the hot TiO₂ burdened gases by mixing them with previously cooled TiO₂ burdened gases (thereby effecting a quite considerable stabilization of pigment properties) is followed by additional heat removal at the stationary cooled walls of the chamber and particularly at the cooled blower wheel. When the TiO₂ burdened gases are cooled to 700–500° C., preferably about 600° C. the TiO₂ pigment is finally stabilized and may then be separated from the gas mixture. The separation is facilitated by the fact that owing to the high turbulence in the cooling chamber a partial agglomeration of the pigment particles takes place which leads to flocculation of the pigment; and that in contrast to prior art processes which effect cooling by introducing large quantities of additional cold inert gas, the titanium dioxide content of the cooled gases discharged from the cooling chamber is relatively high.

A separation of the TiO₂ from the cooled gases may be effected immediately using the customary apparatus such as cyclones. However if the separation is carried out using filters, it is necessary to cool the TiO₂ burdened gases further, i.e. to about 400° C. Although possible, it is not expedient for economic reasons to carry out the cooling of the TiO₂ burdened gases to this temperature in the cooling chamber using the cooling method of this invention. Preferably the residual cooling is done by admixing a cold inert gas with the TiO₂ burdened gases after emergence from the cooling chamber. For this purpose it is necessary to add about equal amounts of cold inert gas to the cooled TiO₂ burdened gas.

It is possible to control the cooling of the TiO₂ burdened gases in the cooling chamber to a certain extent by directing the flow of gases in the cooling chamber and thereby promote the development of definite pigment properties along the lines desired. By directing the flow of gases the mixing-in of the cool recycle gas may be regulated in respect to volume and intensity. For example, the direction of flow of the gases may be influenced in such a way that as complete as possible mixing of the freshly entering hot TiO₂ burdened gases with the precooled gases takes place.

For controlling the gas flow, and thereby the mixing characteristics of the gases, variously formed insets are built into the cooling chamber. Particularly suitable are cylindrical insets or cylindrical bodies with radially arranged projections, details of which are described below and illustrated in the drawings. The arrangement in the chamber must be such that the circulation of the TiO₂ burdened gases is influenced in the desired way. These insets are expediently cooled also so that they also contribute towards the heat removal.

When carrying out the process of this invention it is important that the r.p.m. of the blower wheel be sufficiently high. At a low r.p.m. TiO₂ deposits will form on the cooling surfaces. Revolutions of more than 1000 per minutes, preferably more than 2000 per minute, have been found to be expedient. Moreover the cooling effect also increases with increases in the r.p.m. of the wheel. The cooling surface of the wheel should be as large as possible with respect to an acceptable total weight. An additional requirement is adequate feeding effect. The adjacent stationary cooling surfaces should be arranged in such a way that they are hit sharply by the fast moving gas current but without braking the current too strongly. Under such conditions the overall heat exchange coefficient ($k$-values) of 100 kcal./sq. m./hr. ° C. and more may be reached.

The process according to the invention may also be carried out in modified form in such a way that the recycling of the TiO₂ burdened gases to the combustion chamber outlet does not take place within the interior of the cooling chamber, but outside it. This has the advantage that the coarse portion of the entrained titanium dioxide can be separated from the gases prior to reintroduction into the chamber. Thus an exterior circulation of gases combined with pigment separation takes place instead of the interior circulation of gases without pigment separation as hereinabove described. In this manner retention of the flocculated or agglomerated particles in the cooling chamber over an extended period of time is avoided, an overly long retention period being something that could under certain conditions lead to an impairment of pigment quality. Interior circulation of the TiO₂ burdened gases within the cooling chamber is prevented by suitable built-in devices, for example, by suitable baffle-means as explained below and illustrated in FIG. 4. Thus after flowing through the cooling blower wheel, the cooled TiO₂ burdened gases are forced to leave the cooling chamber via a discharge port in its side. The gases are first passed through a simple pigment separator, for example, a cyclone, where a portion of the TiO₂ pigment, largely the flocculated part, is separated from the gases. The main portion of the TiO₂ plus gases is recycled into the upper part of the cooling chamber without further cooling.

A small portion of the TiO₂ burdened gases equivalent to the amount of fresh hot gas entering the cooling chamber from the combustion chamber in a given unit of time, is discharged via an outlet and after or without additional cooling as the case may be, is completely separated from the entrained pigment.

Referring now to the drawings, one apparatus which may be used for the process according to the invention consists, for example, of a cylindrical chamber having hollow walls which are cooled by water circulated therethrough by means of suitable inlet and outlet pipe connections in the walls of the chamber. At the bottom of the chamber is a blower wheel rotated by suitable drive-means, the drive shaft of the blower being coincident with the longitudinal axis of the chamber. A double-walled blower wheel having inlets and outlets in its hollow drive shaft for circulating a cooling agent through the wheel is particularly suitable for this purpose. The shape and size of the blower wheel are not critical and may be varied to a great extent. More specifically one form of apparatus is shown in FIG. 1 and consists of a cooling chamber 1 having a combustion chamber 2 mounted on top thereof which chamber is fitted at its upper end with burner-means comprising concentric inlet tubes 3 for feeding gaseous titanium tetrachloride, oxygen or a gas containing oxygen and, as the case may be, a combustible auxiliary gas into the combustion chamber where they react at elevated temperatures to form TiO₂ burdened reaction product gases. A discharge tube 4 for the cooled gas mixture branches off from one side of the cooling chamber and contains a thermocouple 5 for measuring the temperature of the cooled gas mixture passing therethrough. In the lower part of the cooling chamber 1 a double-walled blower wheel 6 is installed the details of which are shown in FIGS. 2 and 3 and described below.

FIG. 2 is a plan view of the blower wheel the location of its individual radial blades being indicated by broken lines. They are not visible from above since they are covered by a wide, ring-shaped plate.

FIG. 3 is a vertical section of FIG. 2 in the direction of line 3—3. The two radial blades 21—21 coincide with section line 3—3 and hence are cross-hatched; while the other radial blades are shown schematically by full lines. The surfaces of the blower wheel are kept cool by cooling water which flows through the hollow shaft 23 and the hollow blades 21 of the blower wheel in the direction of the arrows and leaves the blower wheel in reverse direction, again through the hollow shaft 23.

Figure 4:
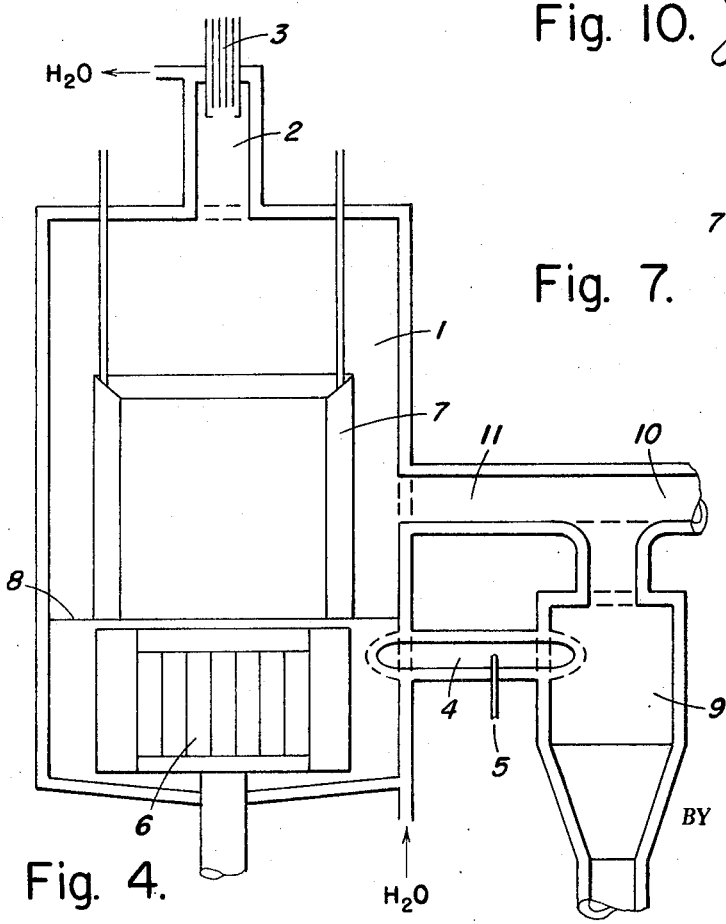
FIG. 4 is a schematic elevation in section of a modification of the apparatus of FIG. 1 embodying exterior conduit gas recycling means.

FIG. 4 shows a preferred form of apparatus for carrying out the invention which, like the apparatus shown in FIG. 1, comprises a cylindrical cooling chamber 1 with a combustion chamber 2 mounted on top thereof, burner-means 3 for feeding the gaseous reactants into the combustion chamber and a blower wheel 6. In this preferred embodiment however the discharge tube 4 is at about the level of the blower wheel 6. In addition a water-cooled cylinder 7 sometimes referred to herein as an inset, is supported in the cooling chamber and is provided with a ring-shaped baffle-plate 8 at its lower end which prevents the direct return of the cooled $TiO_2$ burdened gases from the bottom of the cooling chamber up to the combustion chamber outlet. The cooled $TiO_2$ burdened gases therefore, leave the cooling chamber tangentially through the discharge tube 4, provided with thermocouple 5, and flow into a cyclone 9 where the coarse $TiO_2$ pigment particles are separated therefrom. The $TiO_2$ burdened gases, freed of coarse particles, then return through the connecting pipe 11 tangentially into the cooling chamber 1. A part of the cooled $TiO_2$ burdened gases equivalent in amount to the amount of fresh $TiO_2$ burdened gases being produced in the combustion chamber is drawn off through the discharge tube 10 and passes into a separator for pigment fines.

Figure 6:
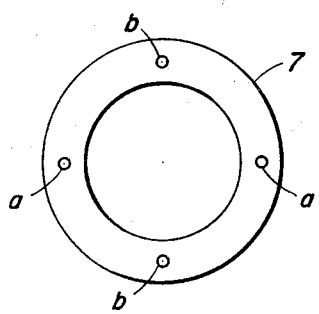
FIG. 6 is a plan view of the inset of FIG. 5.
Figure 10:
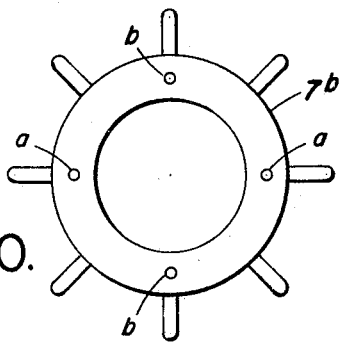
FIG. 10 is a plan view of the inset of FIG. 9.
Figure 7:
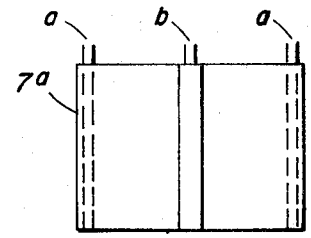
FIG. 7 is a schematic elevation of another form of inset for use in the apparatus of FIG. 4.
Figure 8:
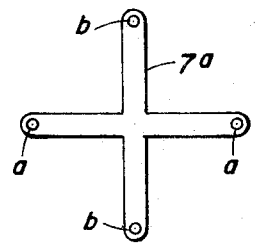
FIG. 8 is a plan view of the inset of FIG. 7.

FIGS. 5, 6, 7, 8, 9 and 10 show in vertical section and in plan view respectively various water cooled insets, sometimes referred to hereafter as gas flow guide-means, which may be inserted in the cooling chamber for directing the flow and/or recycle of the $TiO_2$ burdened gases therein. FIGS. 5 and 6 show in more detail the cylindrically formed inset identified at 7 in FIG. 4. FIGS. 7 and 8 show details of a cross-shaped inset 7a; and FIGS. 9 and 10 disclose a cylindrical inset 7b provided with radially arranged projections. In each of these figures a designates the cooling water inlet and b the outlet.

The following examples serve for more detailed explanation of the process according to the invention:

EXAMPLE I

The device shown in FIG. 1 was employed for cooling $TiO_2$ burdened reaction gases without separating the coarse $TiO_2$ aggregates therefrom. The cooling chamber consisted of a cylinder 1 having a height of 87 cm. and an inner diameter of 70 cm. in the lower part of which a blower wheel 6 having a diameter of 45 cm. and a height of 20 cm. was located. The cooling surface of the chamber, i.e. its inner walls was 2.65 sq. m. while the cooling surface of the wheel 6 was 0.66 sq. m. From the combustion chamber 2 the $TiO_2$ burdened reaction gases formed by the reaction of titanium tetrachloride with oxygen entered the cooling chamber 1 at the rate of 251 standard cu. m./hr. The gases were charged with titanium dioxide amounting to 0.87 kg./cu. m. The temperature of the entering gases was about 1300° C. The blower wheel was rotated at 2500 r.p.m. Under these conditions the $TiO_2$ burdened gases leaving the cooling chamber via outlet 4 attained a temperature of 630° C. after 10 to 20 minutes and remained constant throughout the entire experiment. This temperature was measured in the outlet tube 4 by means of the thermocouple 5. After a run of 2 hours the experiment was interrupted in order to determine the thickness of the coating of $TiO_2$ on the walls. The stationary walls of the housing 1 and the surfaces of the blower wheel 6 were coated with a very thin pigment layer of a thickness of less than 1 mm. Subsequently the experiment was continued for an additional 8 hours. During this time the temperature of the gases leaving the chamber via outlet 4 did not rise. Neither did the coating of the walls increase in thickness. It may be assumed, therefore, that a stationary state had been established in regard to the coating. Consequently the heat removal at the cooled walls remained constant also. Disregarding the short initial period, the heat removed during the entire duration of the experiment amounted to 68,000 kcal./sq. m./hr. from the wheel, 63,000 kcal./sq. m./hr. from the lower third of the stationary chamber wall and 28,000 kcal./sq. m./hr. from the residual upper part of the stationary chamber wall.

EXAMPLE II

For cooling $TiO_2$ burdened reaction gases accompanied by partial pigment separation a device according to FIG. 4 was employed. The dimensions of cooling chamber 1 and blower wheel 6 were the same as stated in Example I. However an inset comprising a water-cooled cylinder 7 according to FIGS. 5 and 6 was mounted in the cooling chamber 1 as shown with a ring-shaped baffle-plate 8 welded on the lower end thereof. The cooling surface of the cylindrical inset was 1.36 sq. m. The volume of reaction gas entering the cooling chamber from the combustion chamber was 251 standard cu. m./hr.; the $TiO_2$ in the reaction gases amounted to 0.87 kg. $TiO_2$ per cu. m.; the temperature of the gases was about 1300° C. and the r.p.m. of the blower wheel 6 2500. After 10 to 20 minutes a temperature of 610° C. established itself in the discharge tube 4 which temperature remained constant during the following 10 hours. In the adjoining cyclone 9 about 50% of the $TiO_2$ pigment fraction was separated from the main portion of the gases before the latter re-entered the cooling chamber 1 tangentially through the pipe connection 11. Of the $TiO_2$ burdened gases leaving the cyclone, as much was discharged per unit of time as was produced simultaneously in the combustion chamber; and was passed into a separator for pigment fines. After a run of 10 hours the blower wheel and the cooling chamber were coated, as in Example I, with a thin pigment layer of less than 1 mm. thickness. The cylindrical inset 7 had a pigment coating of about 10 mm. However, here also constant conditions had been established. When continuing the experiment, this layer did not grow any thicker and the heat removal remained correspondingly constant. The heat removal amounted to 66,000 kcal./sq. m./hr. from the wheel; 63,000 kcal./sq. m./hr. from the lower third of the cooling chamber; 24,000 kcal./sq. m./hr. from the upper part of the chamber wall and 11,000 kcal./sq. m./hr. from the cylindrical inset.

As shown by the preceding examples, the advantage of the process according to the invention is seen particularly in the fact that the indirect heat exchange is carried out at a relatively high temperature level which insures a good heat exchange. Considering the entire output of titanium dioxide pigment produced from the reaction of titanium tetrachloride and oxygen, and considering the additional requirements for cooling the gases to 40–20° C., about 50% of the total amount of heat to be dissipated is transferred to the water in the cooling chamber. Hence this amount of heat does not have to be removed when subsequently cooling the $TiO_2$ aggregates. The heat removal is much favored on the rapidly moving cooling surfaces of the blower wheel and on those stationary surfaces that are exposed to the fast moving current of gases. The exchange of about 70% of the heat, which is removed by indirect cooling in the chamber, takes place at the stationary surfaces. For this reason the moving cooling surfaces i.e. the blower wheel may be kept small in size in comparison with the known process that operate with indirect cooling.

Two effects participate decisively in the success of the process of this invention. First of all the reduction in adhesiveness or stickiness of the pigment as a result of mixing the hot $TiO_2$ burdened gases with cooler gases; and secondly, the high speed which is imparted to the $TiO_2$ burdened gases by the blower wheel. Thus owing both to the reduced adhesiveness of the $TiO_2$ and the high speed imparted to it deposition of the pigment on the stationary faces of the chamber is prevented.

Moreover it is clear that the heat removal process of the present invention is superior also to those prior art processes which carry out cooling by the introduction of relatively large volumes of additional inert gas in which case no heat is removed from the system. Compared with these earlier methods the present invention is characterized by a considerable reduction in the volume of gas as a consequence of which the pigment concentration has been correspondingly increased. In addition, the pigment is discharged in agglomerated form which facilitates subsequent separation. And finally the present invention has an advantage over prior art techniques in that by the recycling of the previously cooled $TiO_2$ burdened reaction mixture a sudden quenching of the $TiO_2$ is avoided and hence a protective, uniform and controlled cooling is obtained which may be an essential prerequisite for the production of special pigmentary characteristics.

We claim:

1. Process for indirectly cooling hot $TiO_2$ burdened reaction gases obtained by the reaction of titanium tetrachloride with oxygen in a combustion chamber comprising the steps of: passing the hot $TiO_2$ burdened gases emerging from the combustion chamber downwardly into a vertically arranged cooling chamber having a cooled blower wheel in the bottom thereof, rotating said cooled blower wheel at relatively high speed, contacting said hot $TiO_2$ burdened gases with said cooled rotating wheel to cool said gases, said contact also imparting circulatory motion to said cooled $TiO_2$ burdened gases whereby they are recycled back up to the combustion chamber, mixing the recycled cooled gases with fresh hot $TiO_2$ burdened reaction gases issuing from said combustion chamber to precool the same to a temperature preferably in the range from 700–500° C. and discharging cooled $TiO_2$ burdened gases from said cooling chamber at a rate corresponding to the rate at which fresh hot $TiO_2$ burdened gases issue from said combustion chamber.

2. Process according to claim 1, wherein the blower wheel is rotated at an r.p.m. such that the amount of cooled $TiO_2$ burdened gases recycled to the combustion chamber is a multiple of the amount of fresh hot $TiO_2$ burdened gases issuing therefrom per unit of time.

3. Process according to claim 1, wherein the blower wheel is rotated at at least 1000 r.p.m. and preferably at more than 2000 r.p.m.

4. Process according to claim 1, wherein the cooled $TiO_2$ burdened gases being recycled are guided during their flow from the cooled blower wheel to the combustion chamber.

5. Process according to claim 1, wherein the cooled $TiO_2$ burdened gases are recycled to said combustion chamber exteriorly of said cooling chamber.

6. Process according to claim 5 wherein the cooled $TiO_2$ burdened gases are freed of coarse particles of $TiO_2$ while being recycled to the cooling chamber exteriorly thereof.

7. Process according to claim 1, wherein the cooled $TiO_2$ burdened gases discharged from said cooling chamber are cooled further to about 400° C. by admixture with a cold inert gas.

8. Apparatus for indirectly cooling the hot $TiO_2$ burdened reaction gases obtained by reaction of $TiCl_4$ with oxygen comprising: a substantially vertical cooling chamber having an opening in the top thereof, a combustion chamber arranged over said opening, both said cooling chamber and said combustion chamber being constructed and arranged with cooled walls, burner-means supported in said combustion chamber arranged to react a mixture of vaporous $TiCl_4$ and oxygen therein and produce hot $TiO_2$ burdened reaction gases which flow down into said cooling chamber via the opening in the top thereof, rotary blower-means arranged in the bottom of said cooling chamber, said rotary blower-means being constructed and arranged with cooled surfaces for cooling the hot $TiO_2$ burdened gases in contact therewith, drive means arranged to rotate said blower-means at speeds from 1000 to as high as 2000 r.p.m. to propel the $TiO_2$ burdened gases in said cooling chamber against the cooled walls thereof at relative high velocities and to recycle the cooled $TiO_2$ burdened gases into the upper end of said cooling chamber there to mix with and cool the fresh hot $TiO_2$ burdened gases issuing from said combustion chamber, and outlet-means in the wall of said cooling chamber arranged to discharge the cooled $TiO_2$ burdened gases therefrom.

9. Apparatus for indirectly cooling the hot $TiO_2$ burdened reaction gases obtained by reaction of $TiCl_4$ with oxygen comprising: a substantially vertical cooling chamber having an opening in the top thereof, a combustion chamber arranged over said opening, both said cooling chamber and said combustion chamber being constructed and arranged with cooled walls, burner-means supported in said combustion chamber arranged to react a mixture of vaporous $TiCl_4$ and oxygen therein and produce hot $TiO_2$ burdened reaction gases which flow down into said cooling chamber via the opening in the top thereof, rotary blower-means arranged in the bottom of said cooling chamber, said rotary blower-means being constructed and arranged with cooled surfaces for cooling the hot $TiO_2$ burdened gases in contact therewith, drive means arranged to rotate said blower-means at speeds from 1000 to as high as 2000 r.p.m. to propel the $TiO_2$ burdened gases in said cooling chamber against the cooled walls thereof at relative high velocities and to recycle the cooled $TiO_2$ burdened gases into the upper end of said cooling chamber there to mix with and cool the fresh hot $TiO_2$ burdened gases issuing from said combustion chamber, an inset arranged in said cooling chamber between said rotary blower-means and the upper end of said cooling chamber for guiding and directing the flow of the gases being recycled therein, and outlet-means in the wall of said cooling chamber arranged to discharge the cooled $TiO_2$ burdened gases therefrom.

10. Apparatus according to claim 9 wherein said rotary blower-means comprises a water-cooled blower wheel.

11. Apparatus for indirectly cooling the hot $TiO_2$ burdened reaction gases obtained by reaction of $TiCl_4$ with oxygen comprising: a substantially vertical cooling chamber having an opening in the top thereof, a combustion chamber arranged over said opening, both said cooling chamber and said combustion chamber being constructed and arranged with cooled walls, burner-means supported in said combustion chamber arranged to react a mixture of vaporous $TiCl_4$ and oxygen therein and produce hot $TiO_2$ burdened reaction gases which flow down into said cooling chamber via the opening in the top thereof, rotary blower-means arranged in the bottom of said cooling chamber, said rotary blower-means being constructed and arranged with cooled surfaces for cooling the hot $TiO_2$ burdened gases in contact therewith, a water-cooled inset arranged in said cooling chamber said inset being constructed with annular baffle-means arranged to confine the $TiO_2$ burdened gases in the lower end of said cooling chamber; drive means arranged to rotate said rotary blower-means at speeds from 1000 to as high as 2000 r.p.m. to propel the $TiO_2$ burdened gases in the lower end of said cooling chamber against the cooled walls thereof at relatively high velocities, and conduit-means arranged externally of said cooling chamber for conveying the cooled $TiO_2$ burdened gases from the lower end of said cooling chamber into the upper end thereof there to mix with and cool the hot $TiO_2$ burdened gases issuing from said combustion chamber, said external conduit-means having an outlet arranged to discharge a portion of the gases being recycled to said cooling chamber.

12. Apparatus according to claim 11 wherein said external conduit-means comprises a cyclone arranged to remove the coarse $TiO_2$ particles from the gases being recycled to the cooling chamber.

13. Apparatus according to claim 11 wherein said inset comprises a water-cooled cylinder.

14. Apparatus according to claim 11 wherein said water cooled inset comprises four radial arms of equal length and at right angles to each other.

15. Apparatus according to claim 11 wherein said water cooled inset comprises a cylinder having a plurality of radially projecting circumferentially spaced fins.

References Cited

UNITED STATES PATENTS

| 2,402,307 | 6/1946 | Vannerus | 165—88 |
| 2,799,482 | 7/1957 | Rawdow | 165—108 |
| 3,224,215 | 12/1965 | Bramekamp et al. | 23—202 |

ROBERT A. O'LEARY, Primary Examiner

C. SUKALO, Assistant Examiner

U.S. Cl. X.R.

23—202; 165—65, 88, 108, 119